United States Patent [19]

Hashimoto

[11] Patent Number: 4,537,844
[45] Date of Patent: Aug. 27, 1985

[54] ELECTROPHOTOGRAPHIC ELEMENT CONTAINING DISAZO COMPOUND

[75] Inventor: Mitsuru Hashimoto, Numazu, Japan

[73] Assignee: Ricoh Co. Ltd., Tokyo, Japan

[21] Appl. No.: 536,924

[22] Filed: Sep. 28, 1983

[30] Foreign Application Priority Data

Oct. 8, 1982 [JP] Japan ................................ 57-177419
Jan. 12, 1983 [JP] Japan ................................ 58-2310

[51] Int. Cl.³ .......................... G03G 5/06; G03G 5/14
[52] U.S. Cl. ........................................ 430/58; 430/72; 430/73; 430/76; 534/759
[58] Field of Search ........................... 430/72, 58, 57; 260/148; 534/759

[56] References Cited
U.S. PATENT DOCUMENTS 4,440,845 4/1984 Hashimoto ................... 430/72 X Primary Examiner—John D. Welsh
Attorney, Agent, or Firm—Flynn, Thiel, Boutell & Tanis

[57] ABSTRACT

A novel disazo compound is provided which is represented by the general formula (I):

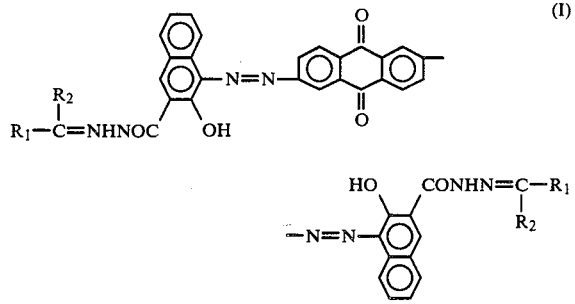

(wherein, $R_1$ and $R_2$ each stands for hydrogen, a lower alkyl group with 1-4 carbon atoms, a substituted or unsubstituted aralkyl group, a substituted or unsubstituted aromatic group, or a substituted or unsubstituted hetero ring group. $R_1$ and $R_2$ may be the same or different. And, $R_1$ and $R_2$ may mutually bond to form a ring).

This disazo compound may be obtained by diazotating 2,6-diaminoanthraquinone and reacting the same with a coupler represented by the general formula (IV):

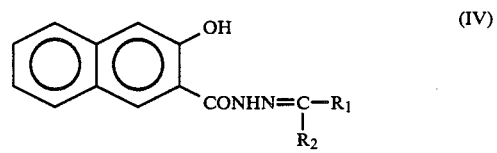

(wherein, $R_1$ and $R_2$ are the same as defined above).

Further, a multilayer type electrophotographic element is provided which comprises a charge carrier generating layer and a charge transfer layer and uses, as a charge carrier generating substance, a disazo compound represented by the general formula (I).

18 Claims, 4 Drawing Figures

ELECTROPHOTOGRAPHIC ELEMENT CONTAINING DISAZO COMPOUND

BACKGROUND OF THE INVENTION (1) Field of The Invention

The present invention relates to a novel disazo compound, a method of making same and an electrophotographic element, in particular a multilayer type electrophotographic element which comprises a charge carrier generating layer containing a substance capable of generating charge carriers when exposed to radiation of light (which will be called a charge carrier generating substance hereinafter) and a charge transfer layer containing a substance capable of accepting charge carriers generated from said charge carrier generating layer and transferring them (which will be called a charge transfer layer hereinafter).

(2) Description of The Prior Art

As electrophotographic elements there have typically been used inorganic ones using selenium and its alloys or dispersed coloring matter-sensitized zinc oxides in a binder resin, and organic ones using charge transfer complexes of 2,4,7-trinitro-9-fluorenone (which will be called TNF hereinafter) and poly-N-vinylcarbazole (which will be called PVK hereinafter) and the like. However, the fact is that these elements have a number of advantages as well as various disadvantages. For instance, the now widely used selenium element is defective in that the manufacturing conditions are complicated, the production cost is expensive, it is difficult to form into a belt-like shape due to lack of flexibility, and attention must be paid in handling because it is very sensitive to heat and mechanical impact. The zinc oxide element is inexpensive because it can be prepared by coating the substrate with a cheap zinc oxide, but defective in that it is generally inferior in sensitivity and mechanical properties such as surface smoothness, tensile strength, friction resistance and the like. Therefore, the zinc oxide element involves various problems such as durability and the like when used repeatedly in plain paper copying machines. And, the element using the charge transfer complex of TNF and PVK is too low in sensitivity to be suitably used in high-speed copying machines.

In recent years, a wide range of studies has been carried out in order to eliminate the shortcomings inherent in these elements. In particular, various organic elements have been proposed for that purpose. Among them, multilayer type elements are attracting public attention as elements for use in plain paper copying machines due to their high sensitivity and stable chargeability as compared with usual organic elements, said multilayer type element comprising an electrically conductive substrate; a thin charge carrier generating layer formed on said substrate by depositing a charge carrier generating pigment capable of generating charge carriers on exposure to light in the proper way, for instance, such as vacuum vapor-deposition, coating a pigment solution or coating a dispersion of fine powdery pigment in a resin solution; and a charge transfer layer, formed thereon, in which the charge carriers generated by the charge carrier generating layer can be injected with efficiency and transferred. And, some of them are put to practical use.

As the conventional multilayer type elements of this sort there are known (1) the multilayer type element using, as the charge carrier generating layer, a thin layer formed by vacuum-vapordepositing a perylene derivative and incorporating an oxadiazole derivative in the charge transfer layer (which see U.S. Pat. No. 3,871,882), (2) the multilayer type element using, as the charge carrier generating layer, a thin layer formed by coating an organic amine solution of Chloro Dian Blue and incorporating a hydrazone compound in the charge transfer layer (which see Japanese Patent Publication No. 42380/1980), (3) the multilayer type element using, as the charge carrier generating layer, a thin layer formed by coating an organic solvent dispersion of distyrylbenzene type disazo compound and incorporating a hydrazone compound in the charge transfer layer (which see Japanese Laid Open Patent Application No. 84943/1980), and the like.

However, the fact is that even in the multilayer type elements of this sort the conventional ones have a number of advantages as well as various disadvantages.

The element using the perylene and oxadiazole derivatives disclosed in the preceding (1) involves the problems that the cost of production is raised because the charge carrier generating layer is formed by vacuum vapordeposition, and the sensitivity is insufficient to be used in the higher speed copying machines even if there is caused no problem when used for practical purpose.

The element using the Chloro Dian Blue and hydrazone compound disclosed in the preceding (2) is superior in sensitivity but involves many disadvantages in the preparation because there is necessity of using a hard-to-handle organic amine (for instance, ethylenediamine) as a coating solvent for the formation of the charge carrier generating layer. Further, this element is inferior in the reproductivity of red images from the original because its sensitivity visible light wavelengths covers the range of about 450 to 660 nm. This necessitates employing a filter to filter out red light when setting this element actually in the copying machine, thereby exerting an unprofitable-influence upon the copying machine design.

The element using the distyrylbenzene type disazo compound and hydrazone compound disclosed in the preceding (3) is very profitable in the preparation because the charge carrier generating layer can be formed readily by coating a dispersion of disazo compound, but is defective, like the element disclosed in the preceding (2), in that the reproductivity of red images from the original is inferior because its sensitive light wavelengths cover the range of about 450 to 700 nm.

As the disazo compounds used in the multilayer type elements there are also known for instance the benzidine type disazo compound disclosed in Japanese Laid Open Patent Applications Nos. 37543/1972 and 55643/1977, the stilbene type disazo compound disclosed in Japanese Laid Open Patent Application No. 8832/1977 and the like.

However, the multilayer type elements using these conventional disazo compounds were generally inferior in sensitivity and deteriorated in the reproductivity of red images from the original because their sensitive light wavelengths cover the range of about 450 to 700 nm. Accordingly, these elements exerted an unprofitable influence upon the copying machine design because the above disadvantages necessitate employing a filter to filter red light when setting these elements actually in the copying machines.

SUMMARY OF THE INVENTION

It is an object of the present invention to provide a novel disazo compound used effectively in electrophotographic elements, in particular the above mentioned multilayer type elements.

It is another object of the present invention to provide a method of making said disazo compound.

It is a further object of the present invention to develop a multilayer type element which can be produced readily, is high in sensitivity and whose sensible light wavelengths are localized in the short wavelength range, 450–600 nm, in other words, which is superior in the reproductivity of red images from the original.

The present invention relate to a novel disazo compound represented by the general formula (I):

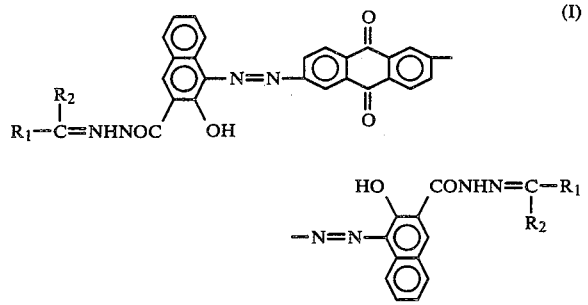

(wherein, $R_1$ and $R_2$ each stands for hydrogen, a lower alkyl group with 1–4 carbon atoms, a substituted or unsubstituted aralkyl group, a substituted or unsubstituted aromatic group, or a substituted or unsubstituted hetero ring group, $R_1$ and $R_2$ may be the same or different. And, $R_1$ and $R_2$ may mutually bond to form a ring.)

In the general formula (I), the lower alkyl group includes an ethyl group, a propyl group or the like; the aralkyl group includes a benzyl group, a phenetyl group or the like; the aromatic group includes a phenyl group, a naphthyl group, an anthryl group, a pyrenyl group, an anthraquinonyl group or the like; and the hetero group includes a thienyl group, a furyl group, a pyridyl group and a carbazolyl group. The ring formed cooperatively by $R_1$ and $R_2$ includes a hexylidene ring, a pentylidene ring, a benzopentylidene ring and a dibenzopentylidene ring. And, as the substituents on the aralkyl group, the aromatic group, the hetero ring group or the ring formed by the cooperation of $R_1$ and $R_2$ there can be enumerated a lower alkyl group with 1–4 carbon atoms, a lower alkoxy group with 1–4 carbon atoms, halogen, a cyano group, a nitro group, a lower dialkylamino group with 2–8 carbon atoms and the like.

The disazo compound represented by the general formula (I) of the present invention, as mentioned above, is effective as the material for use in the electrophotographic element, in particular is effective as the charge carrier generating material for use in the multilayer type electrophotographic element. Further, the disazo compound according to the present invention is useful as the charge carrier generating substance in the electrophotographic element which has the monolayer type photosensitive layer formed by dispersing the charge carrier generating substance and the charge transfer substance in the resin, and is also useful as the photoconductive substance in the electrophotographic element which has the photosensitive layer formed by dispersing the photoconductive substance in the resin.

The present invention also relate to a process for manufacturing a disazo compound represented by the general formula (I):

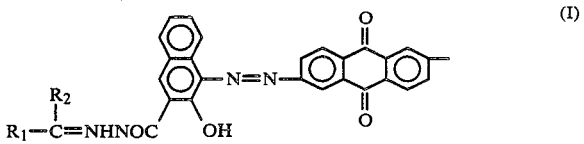

(wherein $R_1$ and $R_2$ are the same defined above), which comprises the steps of diazotating 2,6-diaminoanthraquinone represented by the formula (II):

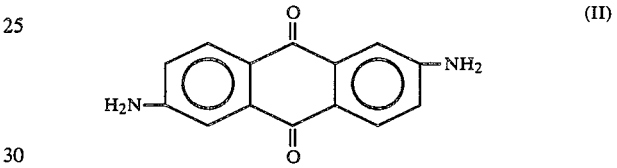

into tetrazonium salt represented by the general formula (III):

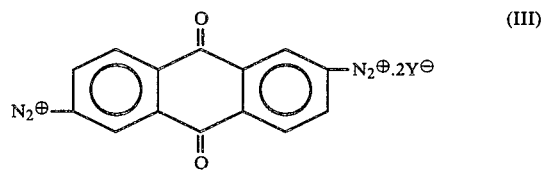

(wherein, Y stands for an anion functional group.), and then reacting this tetrazonium salt with a coupler represented by the general formula (IV):

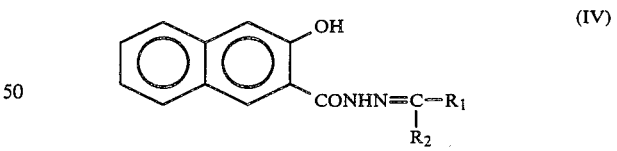

(wherein, $R_1$ and $R_2$ are the same defined above).

In this manufacturing process, the diazotation of 2,6-diaminoanthraquinone is carried out by adding sodium nitrite thereto at a temperature of $-10°$ C. to $50°$ C. in an inorganic acid, for instance, such as hydrochloric acid or sulfuric acid. This diazotation reaction completes in the time ranging from 30 minutes to 3 hours.

It is preferable that the resulting reaction mixture is further added with for instance borofluoric acid or an aqueous sodium borofluoric solution to thereby cause precipitation of tetrazonium salt, and is employed in the next reaction after the precipitated crystals are filtrated therefrom. Then, this tetrazonium salt is reacted with the coupler represented by the general formula (IV) to thereby cause a coupling reaction. Practically, this reaction is carried out by preparing a mixed solution of tetrazonium salt, coupler and an organic solvent such as N,N-dimethylformamide (DMF), dimethyl sulfoxide or the like, and dropping an aqueous alkali solution, for instance, such as an aqueous sodium acetate solution therein at a temperature of about $-10°$ C. to $40°$ C. This reaction completes in about 5 minutes to 3 hours. After completion of said reaction, separated crystals are filtrated and refined by using a proper way (for instance, washing with water or/and organic solvent, recrystallization or the like). Thus, the preparation of said disazo compound is completed.

The present invention is further directed toward a multilayer type electrophotographic element comprising forming, on an electrically conductive substrate, a charge carrier generating layer and a charge transfer layer, wherein said charge carrier generating layer contains therein a disazo compound represented by the general formula (I):

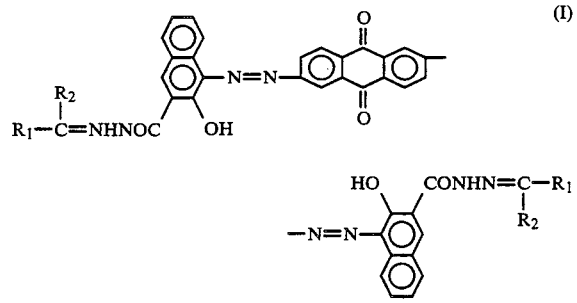

(wherein, $R_1$ and $R_2$ each stands for hydrogen, a lower alkyl group with 1-4 carbon atoms, a substituted or unsubstituted aralkyl group, a substituted or unsubstituted aromatic group, or a substituted or unsubstituted hetero ring group. $R_1$ and $R_2$ may be the same or different. And, $R_1$ and $R_2$ may mutually bond to form a ring.)

In the general formula (I), the lower alkyl group includes an ethyl group, a propyl group or the like; the aralkyl group includes a benzyl group; a phenetyl group or the like; the aromatic group includes a phenyl group, a naphthyl group, an anthryl group, a pyrenyl group, an anthraquinonyl group or the like; and the hetero group includes a thienyl group, a furyl group, a pyridyl group and a carbazolyl group. The ring formed cooperatively by $R_1$ and $R_2$ includes a hexylidene ring, a pentylidiene ring, a benzopentylidiene ring and a dibenzopentylidiene ring. And, as the substituents on the aralkyl group, the aromatic group, the hetero ring group or the ring formed by the cooperation of $R_1$ and $R_2$ there can be enumerated a lower alkyl group with 1-4 carbon atoms, a lower alkoxy group with 1-4 carbon atoms, halogen, a cyano group, a nitro group, a lower dialkylamino group with 2-8 carbon atoms and the like.

The multilayer type element according to the present invention should be said to be a superior one for use in copying machines because it is produced readily, high in sensitivity and further its sensitive wavelengths are localized at the short wavelength region (450 to 600 nm).

Next, the concrete examples of the disazo compound according to the present invention will be shown in Table 1 through Table 3.

TABLE 1

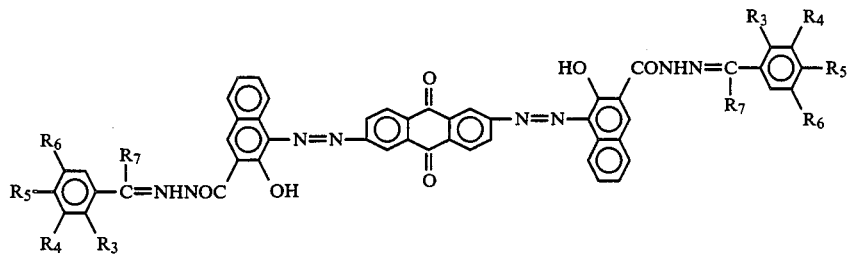

| Compound No. | $R_3$ | $R_4$ | $R_5$ | $R_6$ | $R_7$ |
|---|---|---|---|---|---|
| 1-1 | $-OCH_3$ | H | H | H | H |
| 1-2 | H | $-OCH_3$ | H | H | H |
| 1-3 | H | H | $-OCH_3$ | H | H |
| 1-4 | $-CH_3$ | H | H | H | H |
| 1-5 | H | $-CH_3$ | H | H | H |
| 1-6 | H | H | $-CH_3$ | H | H |
| 1-7 | $-F$ | H | H | H | H |
| 1-8 | H | $-F$ | H | H | H |
| 1-9 | H | H | $-F$ | H | H |
| 1-10 | $-Cl$ | H | H | H | H |
| 1-11 | H | $-Cl$ | H | H | H |
| 1-12 | H | H | $-Cl$ | H | H |
| 1-13 | $-Br$ | H | H | H | H |
| 1-14 | H | $-Br$ | H | H | H |
| 1-15 | H | H | $-Br$ | H | H |
| 1-16 | $-CN$ | H | H | H | H |
| 1-17 | H | H | $-CN$ | H | H |
| 1-18 | $-NO_2$ | H | H | H | H |
| 1-19 | H | $-NO_2$ | H | H | H |
| 1-20 | H | H | $-NO_2$ | H | H |
| 1-21 | H | H | $-OC_2H_5$ | H | H |

TABLE 1-continued
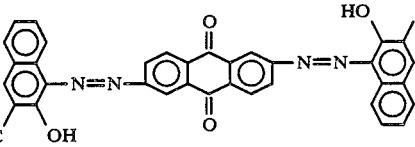
| Compound No. | R₃ | R₄ | R₅ | R₆ | R₇ |
|---|---|---|---|---|---|
| 1-22 | H | H | -N(CH₃)₂ | H | H |
| 1-23 | —CH₃ | H | —CH₃ | H | H |
| 1-24 | —OCH₃ | H | H | —OCH₃ | H |
| 1-25 | —OCH₃ | —OCH₃ | —OCH₃ | H | H |
| 1-26 | —Cl | H | —Cl | H | H |
| 1-27 | H | —Cl | —Cl | H | H |
| 1-28 | H | H | H | H | —CH₃ |
| 1-29 | H | H | H | H | —CH₂—C₆H₅ |
| 1-30 | H | H | H | H | —C₆H₅ |
| 1-31 | H | H | —Cl | H | —CH₃ |
| 1-32 | H | H | H | H | H |
TABLE 2
| Compound No. | R₈ | R₉ |
|---|---|---|
| 1-33 | 4-pyridyl (N at 4-position) | H |
| 1-34 | 3-pyridyl | H |
| 1-35 | 2-thienyl | H |
| 1-36 | 2-furyl | H |

TABLE 2-continued
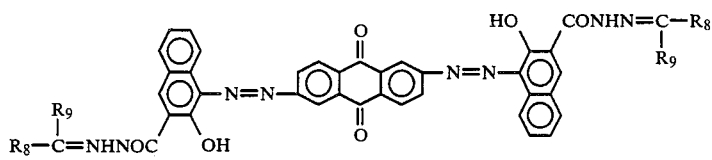
| Compound No. | R$_8$ | R$_9$ |
|---|---|---|
| 1-37 | (1-naphthyl) | H |
| 1-38 | (2-anthryl) | H |
| 1-39 | (9-ethylcarbazol-3-yl) | H |
| 1-40 | (anthraquinon-2-yl) | H |
| 1-41 | (4-methoxynaphth-1-yl with OCH$_3$) | H |
| 1-42 | —C$_2$H$_5$ | H |
| 1-43 | —CH$_3$ | —CH$_3$ |
| 1-44 | (2-naphthyl) | H |

TABLE 2-continued

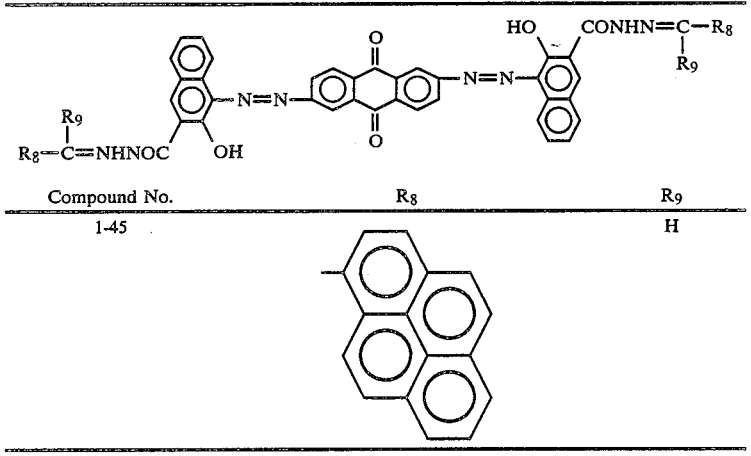

| Compound No. | $R_8$ | $R_9$ |
|---|---|---|
| 1-45 | (pyrenyl) | H |

TABLE 3

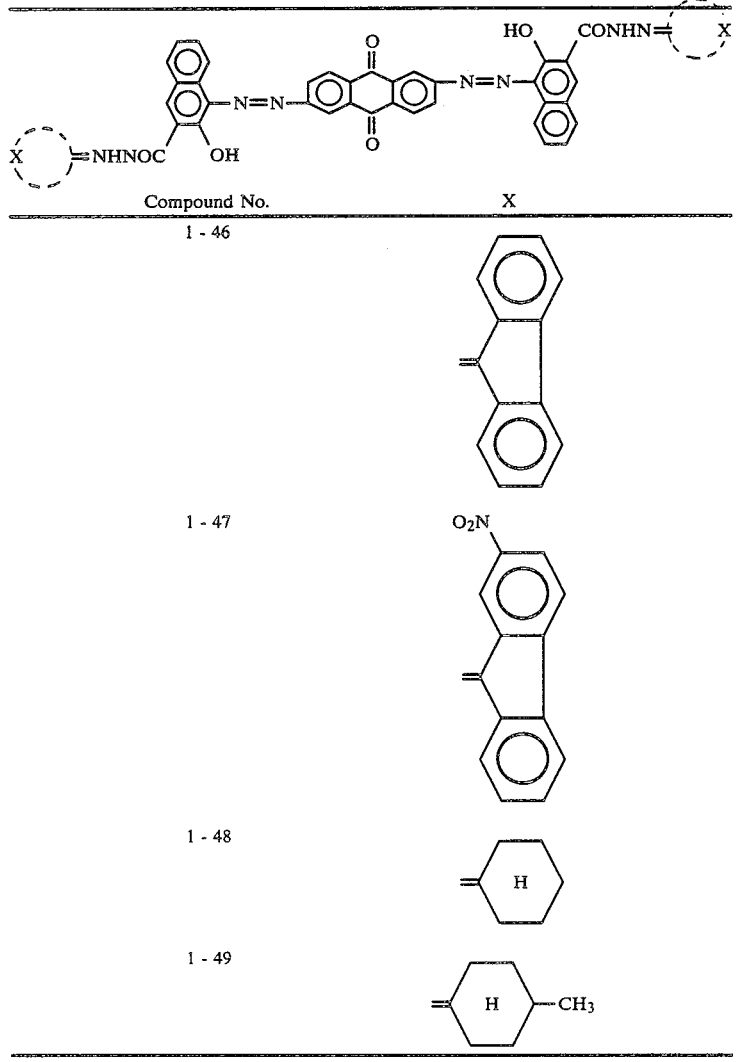

| Compound No. | X |
|---|---|
| 1-46 | (fluorenylidene) |
| 1-47 | (2-nitrofluorenylidene) |
| 1-48 | (cyclohexylidene, H) |
| 1-49 | (4-methylcyclohexylidene, H, $CH_3$) |

These disazo compounds can be prepared easily according to the manufacturing process as mentioned above. That is, said disazo compounds can be readily manufactured by diazotating the commercially available 2,6-diaminoanthraquinone (produced by Aldrich Chemical Co., Milwakee) in a normal manner to thereby obtain tetrazonium salt, and then subjecting this salt and couplers corresponding thereto, 2-hydroxy-3- hydrazide naphthoate and the like, to a coupling reaction in a proper solvent such, for instance, as N-dimethylformamide (DMF) under the influence of a base.

FIG. 1 is a grossly enlarged sectional view of an electrophotographic element embodying the present invention. This element is designed to form, on an electrically conductive substrate 11, a photosensitive layer 44 comprising a charge carrier generating layer 22 and a charge transfer layer 33.

As the electrically conductive layer suitably used in the present invention there can be enumerated metal plates, metal drums or metal foil of aluminum, nickel, chromium and the like, plastic films provided with thin layers of aluminum, tin oxide, indium oxide, chromium, palladium and the like, and electrically conductive substance-coated or impregnated paper or plastic films.

The charge carrier generating layer is formed on the electrically conductive substrate by coating the surface of the substrate with a dispersion obtained by dispersing, in a suitable solvent, very fine powders of the above specified disazo compound having the general formula (I) pulverized by means of a ball mill or the like and if needed, dissolving a binder resin thereto. The thus formed charge carrier generating layer is surface-finished for instance by buffing or the like and the film thickness is regulated as occasion demands.

The thickness of this charge carrier generating layer 22 is 0.01 to 5 $\mu$m, preferably 0.05 to 2 $\mu$m. The percentage of disazo compound contained in the charge carrier generating layer is 10 to 100% by weight, preferably 30 to 95% by weight. In case the film thickness of the charge carrier generating layer is less than 0.01 $\mu$m the sensitivity deteriorates, and in case the film thickness is above 5 $\mu$m the potential retainability deteriorates. Further, in case the percentage of disazo compound contained in the charge carrier generating layer is less than 10% by weight the sensitivity deteriorates.

The charge transfer layer is formed by coating the surface of said charge carrier generating layer with a solution obtained by dissolving various charge transfer substances and binder resins referred to afterwards in a proper solvent for instance such as tetrahydrofuran or the like. The percentage of the charge transfer substance contained in the charge transfer layer is 10 to 80% by weight, preferably 25 to 75% by weight, and the film thickness of said layer is 2 to 100 $\mu$m, preferably 5 to 40 $\mu$m. In case the percentage of the charge transfer substance contained in the charge transfer layer is less than 10% by weight the sensitivity deteriorates, while in case said percentage is above 80% by weight there are brought about undesirable results such that the film becomes brittle and the charge transfer layer becomes cloudy due to separated crystals. In case the thickness of the charge transfer layer is less than 2 $\mu$m the potential retainability deteriorates and in case said thickness is above 100 $\mu$m the residual potential rises.

The typical examples of the charge transfer substance used in the charge transfer layer will be shown below.

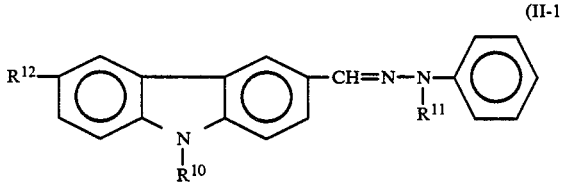
(II-1)

(wherein, $R^{10}$ stands for an alkyl group such as a methyl group, an ethyl group or the like; a substituted alkyl group such as 2-chloroethyl group, 2-hydroxyethyl or the like; $R^{11}$ stands for an alkyl group such as a methyl group, an ethyl group or the like; an aralkyl group such as a benzyl group or the like; an aryl group such as a phenyl group or the like; $R^{12}$ stands for hydrogen; halogen such as chlorine, bromine or the like; an alkyl group such as a methyl group, an ethyl group, a propyl group, a butyl group or the like; an alkoxy group such as a methoxy group, an ethoxy group, a propoxy group, a butoxy group or the like; a dialkylamino group; or a nitro group.)

(II-2)

(wherein, Ar' stands for a naphthyl group, an anthryl group, a styryl group or substituents thereof; $R^{13}$ stands for an alkyl group such as a methyl group, an ethyl group or the like; an aralkyl group such as a benzyl group or the like; and an aryl group such as a phenyl group. As the substituents on said naphthyl group, anthryl group and styryl group there can be enumerated, for instance, an alkyl group such as a methyl group, an ethyl group or the like; an alkoxy group such as a methoxy group, an ethoxy group or the like; a dialkylamino group such as a dimethylamino group, a diethylamino group or the like; and the like.)

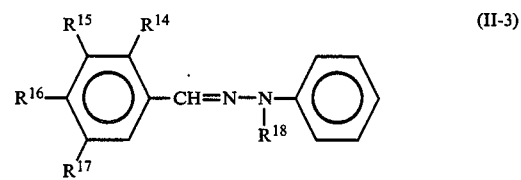
(II-3)

(wherein $R^{14}$, $R^{15}$ or $R^{17}$ stands for hydrogen; an alkyl group such as a methyl group, an ethyl group, a propyl group or the like; an alkoxy group such as a methoxy group, an ethoxy group, a propoxy group or the like; halogen such as chlorine, bromine or the like; a nitro group; or a hydroxyl group; $R^{16}$ stands for hydrogen, an alkyl group such as a methyl group, an ethyl group, a propyl group or the like; an alkoxy grioup such as a methoxy group, an ethoxy group, propoxy group or the like; a dialkylamino group such as a dimethylamino group, a diethylamino group or the like; a diaralkylamino group such as a dibenzylamino group or the like; a diarylamino group such as a diphenylamino group or the like; halogen such as chlorine, bromine or the like; a nitro group or a hydroxyl group; and $R^{18}$ stands for an alkyl group such as a methyl group, an ethyl group or the like; an aralkyl group such as a benzyl group or the like; and an aryl group such as a phenyl group or the like.)

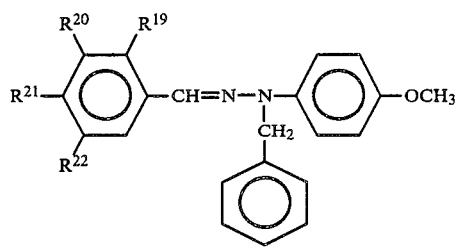

(II-4)

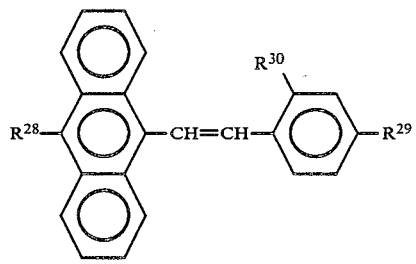

(II-6)

(wherein, $R^{19}$, $R^{20}$, $R^{21}$ or $R^{22}$ each stands for hydrogen; an alkyl group such as a methyl group, an ethyl group, a propyl group or the like; an alkoxy group such as a methoxy group, an ethoxy group, a propoxy group and the like; a dialkylamino group such as a dimethylamino group, a diethylamino group or the like; halogen such as chlorine, bromine or the like; a nitro group or a hydroxyl group.)

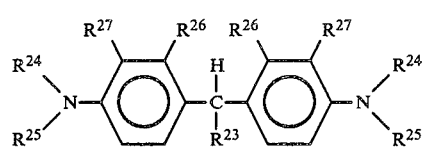

(II-5)

(wherein, $R^{23}$ stands for an alkyl group having carbon atoms of 1 to 11, a substituted or unsubstituted phenyl group and a substituted or unsubstituted heterocyclic group; $R^{24}$ or $R^{25}$ stands for hydrogen; an alkyl group such as methyl group, an ethyl group, a propyl group, a butyl group and the like; a chloro-substituted alkyl group; a hydroxy-substituted alkyl group; and a substituted or unsubstituted aralkyl group; and $R^{24}$ and $R^{25}$ may bond together to form a nitrogen-containing heterocycle. $R^{26}$ or $R^{27}$ stands for hydrogen, an alkyl group such as methyl group, an ethyl group, a propyl group, a butyl group or the like; an alkoxy group such as a methoxy group, an ethoxy group or the like; and halogen such as chlorine, bromine or the like. The heterocyclic group in $R^{23}$ includes a pyridyl group, a furyl group, a thienyl group, an indolyl group, a pyrrolyl group, a quinolyl group, a carbazolyl group and the like. As the substituents on the phenyl group or the heterocyclic group in $R^{23}$ include there can be enumerated an alkyl group such as a methyl group, an ethyl group or the like; an alkoxy group such as a methoxy group, an ethoxy group, and the like. As the aralkyl group represented by $R^{24}$ or $R^{25}$ there can be enumerated for instance a benzyl group or the like, and as the substituents on the aralkyl group there can be enumerated halogen such as chlorine, bromine or the like; an alkyl group such as a methyl group, an ethyl group or the like; a nitro group and the like. The heterocycle formed by bonding $R^{24}$ with $R^{25}$ includes a morpholine ring.

(wherein, $R^{28}$ stands for hydrogen; halogen such as chlorine, bromine or the like; $R^{29}$ stands for hydrogen; halogen such as chlorine, bromine or the like; an alkyl group such as a methyl group, an ethyl group or the like; an alkoxy group such as methoxy group, an ethoxy group or the like; a dialkylamino group such as a dimethylamino group, a diethylamino group, a dibutylamino group or the like; a diaralkylamino group such as a dibenzylamino group, a chloro-substituted dibenzylamino group or the like; a nitro group, a cyano group or

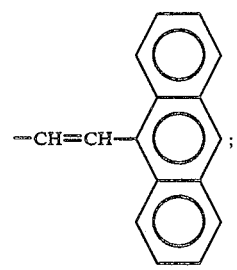

and $R^{30}$ stands for hydrogen; halogen such as chlorine, bromine or the like; and an alkyl group such as a methyl group, an ethyl group or the like.)

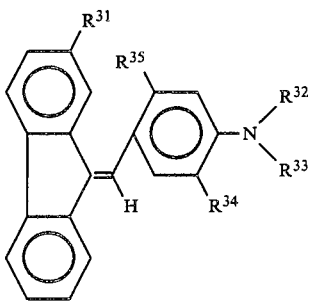

(II-7)

(wherein, $R^{31}$ stands for hydrogen; halogen such as chlorine bromine or the like; an alkyl group such as a methyl group, an ethyl group, a butyl group or the like; an alkoxy group such as a methoxy group, an ethoxy group, an butoxy group, a cyano group or the like; $R^{32}$ or $R^{33}$ stands for hydrogen; an alkyl group such as a methyl group, an ethyl group, a butyl group or the like; a substituted alkyl group such as 2-chloroethyl group, 2-hydroxyethyl group or the like or an unsubstituted benzyl group; and $R^{34}$ or $R^{35}$ stands for hydrogen; halogen such as chlorine, bromine or the like; an alkyl group such as a methyl group, an ethyl group, a butyl group or the like; an alkoxy group such as a methoxy group, an ethoxy group, a butoxy group or the like; and a dialkylamino group such as a dimethylamino group, a diethylamino group or the like. As the substituents on the benzyl group in $R^{32}$ or $R^{33}$ there can be enumerated an alkyl group such as a methyl group, an ethyl group or the like; an alkoxy group such as a methoxy group, an ethoxy or the like; a nitro group or the like.)

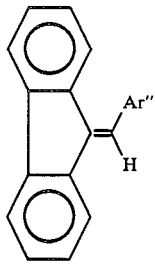
(II-8)

(wherein, Ar" stands for N-alkylcarbazolyl group. As the alkyl group there can be enumerated a methyl group, an ethyl group, a propyl group, a butyl group or the like.)

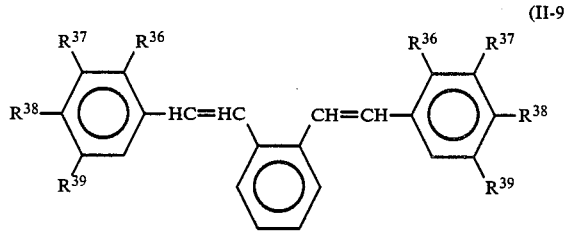
(II-9)

(wherein, $R^{36}$, $R^{37}$ and $R^{39}$ each stands for hydrogen; halogen such as chlorine, bromine or the like; an alkyl group such as a methyl group, an ethyl group or the like; an alkoxy group such as a methoxy group, an ethoxy group; a nitro group or an amino group. $R^{38}$ stands for hydrogen; halogen such as chlorine, bromine or the like; an alkyl group such as a methyl group, an ethyl group or the like; an alkoxy group such as a methoxy group, an ethoxy group or the like; a dialkylamino group such as a dimethylamino group, a diethylamino group, a dibutylamino group or the like; a substituted or unsubstituted diaralkylamino group such as a dibenzylamino group, a chloro-substituted dibenzylamino group, a methyl-substituted dibenzylamino group, a methoxy-substituted dibenzylamino group or the like; N-alkyl-N-aralkylamino group such as N-methyl-N-benzylamino group or the like; a carboxy group or its ester; an amino group; a hydroxy group; a cyano group, or a acetylamino group.)

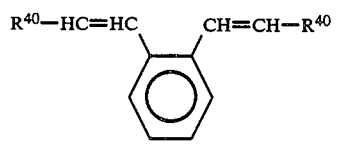
(II-10)

(wherein, $R^{40}$ stands for N-alkylcarbazolyl group, a pyridyl group, a thienyl group, an indolyl group, a furyl group or a substituted or unsubstituted naphthyl, styryl or anthryl group. As the substituents on the naphthyl group, the styryl group or the anthryl group there can be enumerated an alkyl group such as a methyl group, an ethyl group or the group; an alkoxy group such as a methoxy group, an ethoxy group or the like; a dialkyl-amino group such as a dimethylamino group a diethylamino group or the like.)

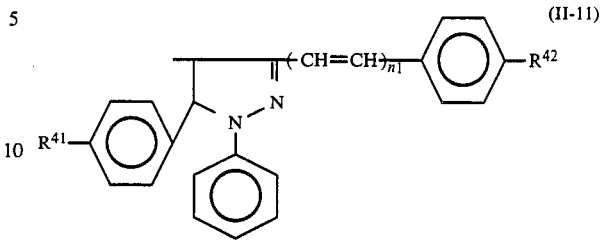
(II-11)

(wherein $R^{41}$ and $R^{42}$ each stands for hydrogen; an alkyl group such as a methyl group, an ethyl group, a butyl group or the like; an alkoxy group such as a methoxy group, an ethoxy group, a butoxy group or the like; halogen such as chlorine, bromine or the like; or a dialkylamino group such as a dimethylamino group, a diethylamino group or the like. $n_1$ is 0 or 1.)

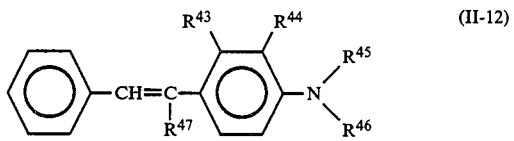
(II-12)

(wherein, $R^{43}$ and $R^{44}$ each stands for hydrogen; an alkyl group such as a methyl group, an ethyl group or the like; an alkoxy group such as a methoxy group, an ethoxy group or the like; halogen such as chlorine, $R^{45}$ and $R^{46}$ each stands for an alkyl group such as a methyl group, an ethyl group, a propyl group, a butyl group or the like; a substituted or unsubstituted aralkyl group, or a substituted or unsubstituted aryl group, $R^{47}$ stands for hydrogen or a substituted or unsubstituted phenyl group. As the aralkyl group in $R^{45}$ and $R^{46}$ there can be enumerated for instance a benzyl group, and as the aryl group in $R^{45}$ and $R^{46}$ there can be enumerated for instance a phenyl group. And, the substituents on the aralkyl group or the aryl group include an alkyl group such as a methyl group, an ethyl group, a butyl group or the like; an alkoxy group such as a methoxy group, an ethoxy group or the like; halogen such as chlorine or the like; or a dialkylamino group such as a dimethylamino group, a diethylamino group or the like.)

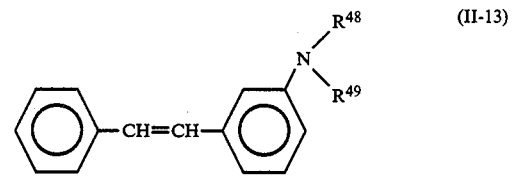
(II-13)

(wherein, $R^{48}$ and $R^{49}$ each stands for an alkyl group such as a methyl group, an ethyl group or the like; a substituted or unsubstituted phenyl group, or a substituted or unsubstituted benzyl group. The substituents thereon include an alkyl group such as a methyl group, an ethyl group or the like and an alkoxy group such as a methoxy group, an ethoxy group or the like.)

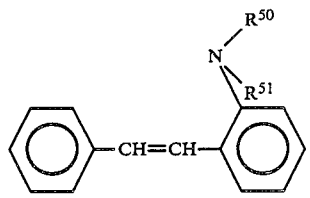 (II-14)

(wherein, $R^{50}$ and $R^{51}$ stand for the same groups as defined above by $R^{48}$ and $R^{49}$.)

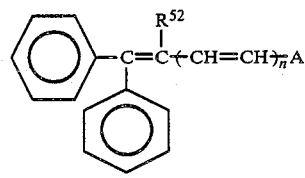 (II-15)

[wherein, $R^{52}$ stands for hydrogen, an alkyl group such as a methyl group, an ethyl group or the like; or a substituted or unsubstituted phenyl group. $n_2$ is an integer of 0 or 1. A stands for

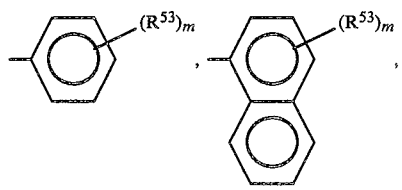

9-anthryl group or a substituted or unsubstituted N-alkylcarbazolyl group. Hereon, $R^{53}$ stands for hydrogen; an alkyl group; an alkoxy group, halogen, or a substituted amino group represented by

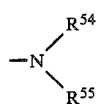

($R^{54}$ and $R^{55}$ each may stand for an alkyl group such as a methyl group, an ethyl group, a propyl group, a butyl group or the like; a substituted or unsubstituted aralkyl group such as a benzyl group or the like; a substituted or unsubstituted aryl group such as a phenyl group or the like, and $R^{54}$ and $R^{55}$ may bond to form a ring.). m is an integer of 0,1, 2 or 3. In case m is 2 or more, $R^{53}$ may be the same group or different. As the substituents on the aralkyl group or the aryl group in $R^{54}$ or $R^{55}$ there may be enumerated an alkyl group such as a methyl group, an ethyl group, a propyl group, a butyl group or the like; an alkoxy group such as a methoxy group, an ethoxy group or the like; halogen such as chlorine; a dialkylamino group such as a diethylamino group or the like.]

Further, the concrete examples of these charge transfer substances are as shown in below.

| Compound No. | structural formula |
|---|---|
| 2-1 | |
| 2-2 | |
| 2-3 | |
| 2-4 | |
| 2-5 | |
| 2-6 | |
| 2-7 | |
| 2-8 | |
| 2-9 | |
| 2-10 | |
| 2-11 | |

-continued
| Compound No. | structural formula |
|---|---|
| 2-12 | 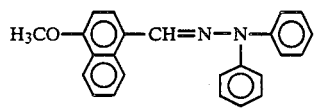 |
| 2-13 | 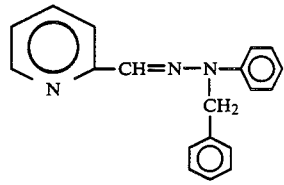 |
| 2-14 | 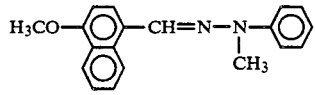 |
| 2-15 | 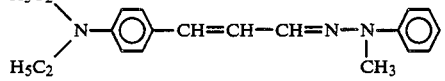 |
| 2-16 | 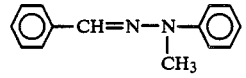 |
| 2-17 | 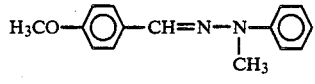 |
| 2-18 | 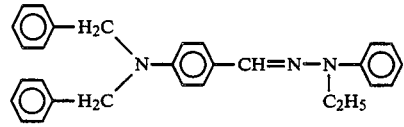 |
| 2-19 | 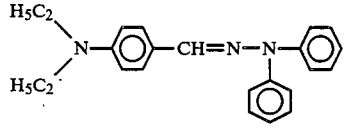 |
| 2-20 | 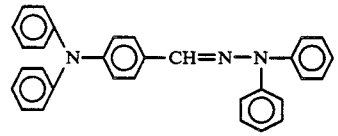 |
| 2-21 | 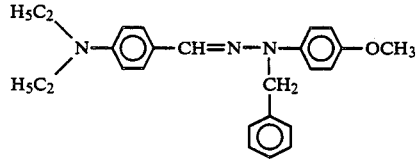 |
| 2-22 | 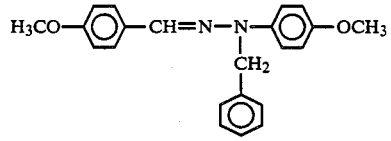 |
-continued
| Compound No. | structural formula |
|---|---|
| 2-23 | 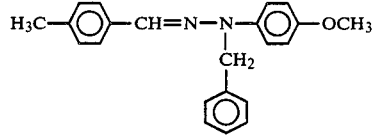 |
| 2-24 | 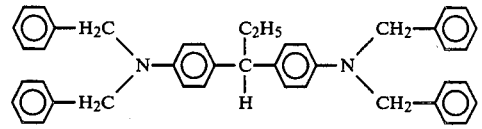 |
| 2-25 | 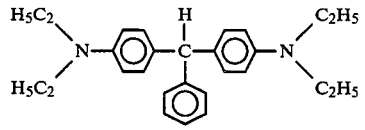 |
| 2-26 | 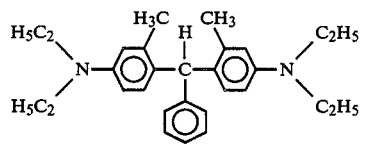 |
| 2-27 | 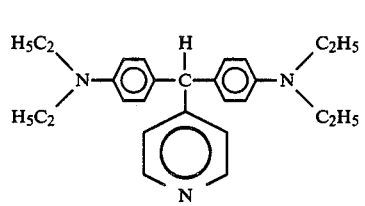 |
| 2-28 | 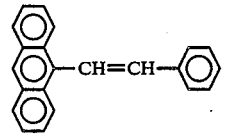 |
| 2-29 | 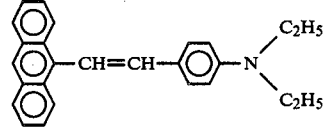 |
| 2-30 | 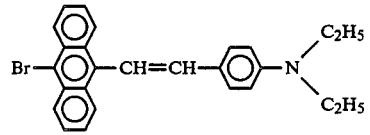 |
| 2-31 | 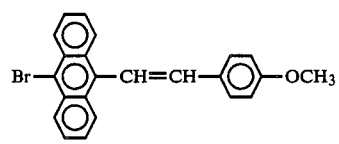 |

| Compound No. | structural formula |
|---|---|
| 2-32 | (fluorene)=CH—CH=(phenyl)—OCH₃ |
| 2-33 | (fluorene)=CH—(phenyl)—N(CH₂—phenyl)₂ |
| 2-34 | (fluorene)=CH—(phenyl)—N(CH₂—C₆H₄—Cl)₂ |
| 2-35 | (fluorene)=CH—(phenyl)—N(CH₂—C₆H₄—CH₃)₂ |
| 2-36 | (fluorene)=CH—(phenyl)—N(CH₂—(3,5-dimethylphenyl))₂ |
| 2-37 | (methyl-fluorene)=CH—(phenyl)—N(CH₂—phenyl)₂ |
| 2-38 | (fluorene)=CH—(2,6-dimethylphenyl)—N(CH₂—phenyl)₂ |
| 2-39 | (diphenylamino)—C₆H₄—HC=CH—(phenyl)—CH=CH—C₆H₄—N(phenyl)₂ |
| 2-40 | (H₅C₂)₂N—(3-methylphenyl)—HC=CH—(phenyl)—CH=CH—(3-methylphenyl)—N(C₂H₅)₂ |
| 2-41 | (PhCH₂)₂N—C₆H₄—HC=CH—(phenyl)—CH=CH—C₆H₄—N(CH₂Ph)₂ |
| 2-42 | H₂N—C₆H₄—HC=CH—(phenyl)—CH=CH—C₆H₄—NH₂ |
| 2-43 | (H₃C)₂N—C₆H₄—HC=CH—(phenyl)—CH=CH—C₆H₄—N(CH₃)₂ |
| 2-44 | pyrazoline with (H₅C₂)₂N—C₆H₄— and —CH=CH—C₆H₄—N(C₂H₅)₂, N-phenyl |
| 2-45 | pyrazoline with (Ph)₂N—C₆H₄— and —CH=CH—C₆H₄—N(Ph)₂, N-phenyl |
| 2-46 | pyrazoline with H₅C₂O—C₆H₄— and —CH=CH—C₆H₄—OC₂H₅, N-phenyl |
| 2-47 | pyrazoline with H₃C—C₆H₄— and —CH=CH—C₆H₄—CH₃, N-phenyl |
| 2-48 | pyrazoline with H₃C—C₆H₄— and —phenyl, N-phenyl |

| Compound No. | structural formula |
|---|---|
| 2-49 | ⟨Ph⟩–CH=CH–⟨C6H4⟩–N(⟨Ph⟩)(⟨Ph⟩) |
| 2-50 | ⟨Ph⟩–CH=CH–⟨C6H4⟩–N(CH₂⟨Ph⟩)(CH₂⟨Ph⟩) |
| 2-51 | ⟨Ph⟩–CH=C(–⟨C6H4⟩–N(CH₃)(CH₃))–⟨C6H4⟩–N(CH₃)(CH₃) (lower ring N(CH₃)₂) |
| 2-52 | ⟨Ph⟩–CH=CH–⟨C6H3(OCH₃)⟩–N(CH₂⟨Ph⟩)(CH₂⟨Ph⟩) |
| 2-53 | ⟨Ph⟩–CH=CH–⟨C6H4⟩–N(⟨C6H4⟩–CH₃)(⟨C6H4⟩–CH₃) |
| 2-54 | ⟨Ph⟩–CH=CH–⟨C6H4⟩–N(⟨Ph⟩)(⟨C6H4⟩–CH₃) |
| 2-55 | ⟨Ph⟩–CH=CH–⟨C6H4⟩–N(CH₂⟨C6H4⟩–Cl)(CH₂⟨C6H4⟩–Cl) |
| 2-56 | (⟨Ph⟩)(⟨Ph⟩)C=CH–⟨C6H4⟩–N(⟨Ph⟩)(⟨Ph⟩) |
| 2-57 | (⟨Ph⟩)(⟨Ph⟩)C=CH–⟨C6H4⟩–N(C₂H₅)(C₂H₅) |
| 2-58 | (⟨Ph⟩)(⟨Ph⟩)C=CH–⟨C6H4⟩–N(CH₂⟨Ph⟩)(CH₂⟨Ph⟩) |
| 2-59 | (⟨Ph⟩)(⟨Ph⟩)C=CH–⟨C6H4⟩–N(⟨C6H4⟩–CH₃)(⟨C6H4⟩–CH₃) |
| 2-60 | (⟨Ph⟩)(⟨Ph⟩)C=CH–⟨C6H4⟩–N(⟨C6H4⟩–OCH₃)(⟨Ph⟩) |
| 2-61 | (⟨Ph⟩)(⟨Ph⟩)C=CH–⟨C6H4⟩–N(⟨C6H4⟩–Cl)(⟨C6H4⟩–Cl) |

In addition to the above enumerated compounds, there can be effectively employed any one of the following known charge transfer substances including the high molecular substances such as poly-N-vinylcarbazole, halogenated-poly-N-vinylcarbazole, polyvinylpyrene or condensation resins such as bromopyrene-formaldehyde condensation resin, N-ethylcarbazole-formaldehyde condensation resin and the like, and the low molecular substances such as oxazole derivatives, oxadiazole derivatives, nitro derivatives of fluorenone and the like.

The binder resins used for the charge carrier generating layer herein include polyester resin, butyral resin, ethyl cellulose resin, epoxy resin, acryl resin, vinylidene chloride resin, polystyrene, polybutadiene and their copolymers. They may be used singly or in the mixed state of two kinds or more.

The binder resins for use in the charge transfer layer include polycarbonate resin, polyester resin, polystyrene, polyurethane resin, epoxy resin, acryl resin, silicone resin and their copolymers. They may be used singly or in the mixed state of two kinds or more.

Further, various additives may be incorporated in the charge transfer layer for the purpose of improving its flexibility or durability. As the additives used for this purpose there can be enumerated halogenated paraffin, dialkyl phthalate, silicone oil and the like. In the case of the element according to the present invention, it is also possible to provide a barrier layer between the electrically conductive substrate and the charge carrier generating layer, an intermediate layer between the charge carrier generating layer and the charge transfer layer, and an overcoat layer on the charge transfer layer as occasion demands.

Still further, the disazo compounds having the general formula (I) of the present invention may be dispersed, taking the powdery form, in the binder resin (which, if needed, may contain the charge transfer substance). That is, said disazo compounds may also be used in a dispersion type element.

The electrophotographic element of the present invention is constructed as mentioned above. Accordingly, as will be evident from examples and comparative examples referred to afterwards, the electrophotographic element of the present invention may be said to have superior properties that it is produced easily as compared with the conventional multilayer type elements, it is high in sensitivity because its sensitive light wavelengths are localized at the short wavelength region (about 450 to 600 nm), and it is stable in characteristics even when used repeatedly.

PREFERRED EMBODIMENTS OF THE INVENTION

Next, the present invention will be explained substantially with reference to examples. However, it is to be understood that the embodiments of the present invention should not be limited thereto.

First, the preparation examples of the disazo compounds according to the present invention will be given as follows.

PREPARATION EXAMPLE 14.3 g (0.06 mol) of 2,6-diaminoanthraquinone (produced by Aldrich Chemical Co., Milwaukee) was mixed with 155 ml of 36% hydrochloric acid to obtain a mixture. A solution obtained by dissolving 9.0 g of sodium nitrite in 30 ml of water was then dropped in said mixture at a temperature of $-5°$ C. to $0°$ C. in about 20 minutes. After completion of dropping, said solution was stirred for additional two hours at the same temperature. Thereafter, it was poured in 3 l of cold water and was filtered to remove a small amount of insoluble matter. 40 ml of 42% borofluoric acid was added to this filtrate. Thus separated crystals were filtered, were washed with about 50 ml of methanol and then dried to obtain 22.6 g (86.3%) of anthraquinone-2,6-bisdiazoniumbistetrafluoroborate as light-brown crystals.

Infrared absorption spectrum (KBr disc): $\nu N_2$—2310 cm$^{-1}$. $\nu CO$—1695 cm$^{-1}$.

Successively, 2.18 g, 0.005 mole, of the thus obtained tetrazonium salt and 0.01 mol of the coupler having the general formula (IV) were dissolved in 300 ml of DMF. Then, a solution dissolved 1.64 g of sodium acetate in 14 ml of water was dropped thereinto at room temperature for about 15 minutes. After completion of said dropping, it was stirred for additional 2 hours, and then separated crystals were filtered out. The resulting coarse crystal cake was dispersed in 300 ml of DMF and was stirred at $80°$ C. for 2 hours. Thereafter, crystals were again filtered out therefrom. This operation was repeated two times additionally. Then, the filtered crystals were washed with water and dried, thereby obtaining the disazo compound according to the present invention. The examples of the disazo compounds synthesized according to the above mentioned preparation example will be shown Table 4 and Table 6.

Figure 4:
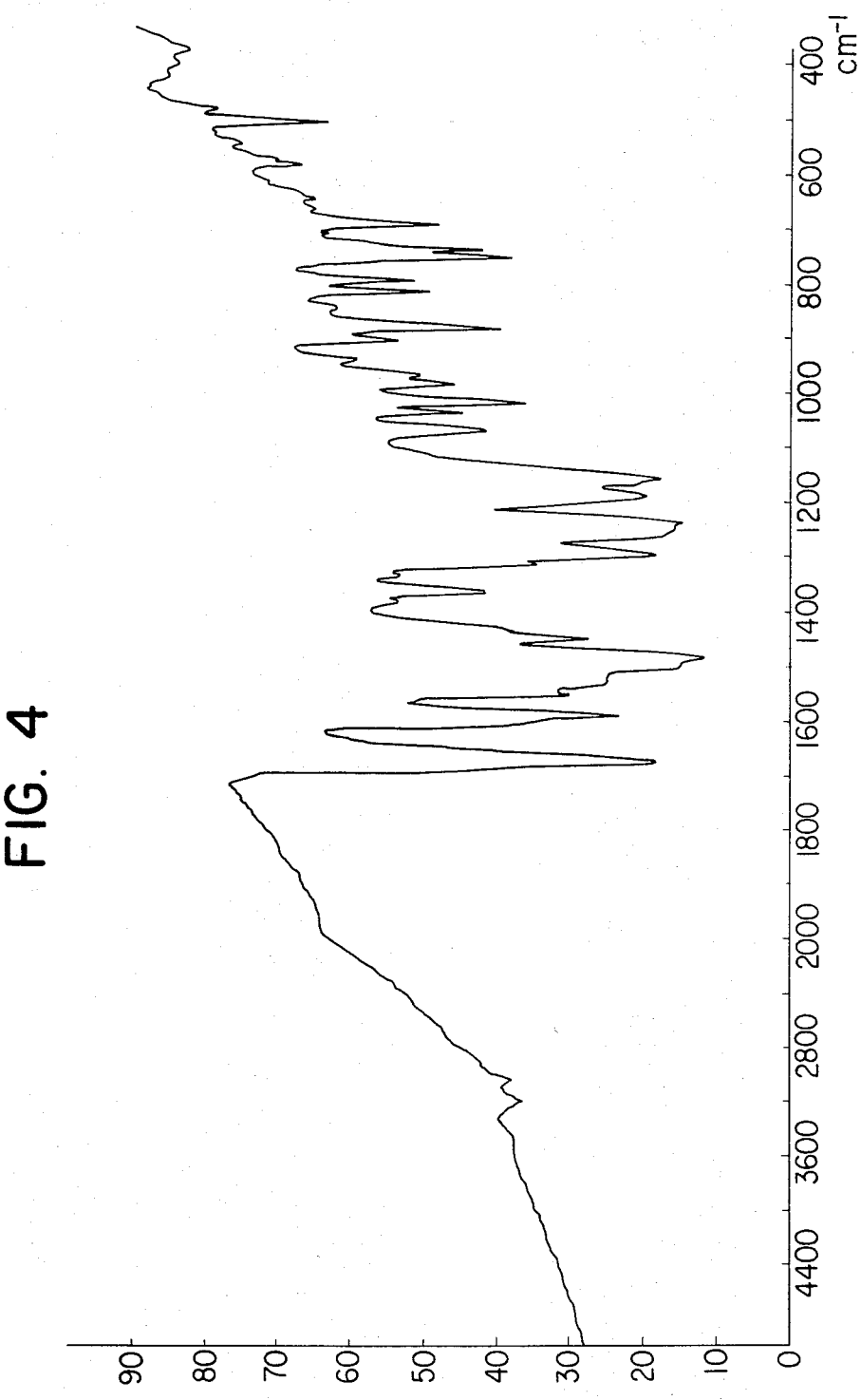
FIG. 4 is a view illustrating infrared absorption spectrums (KBr tablet method) of the typical disazo compounds according to the present invention.

These disazo compounds take the form of red or reddish purple powder at room temperature. FIG. 4 indicates infrared absorption spectrums (KBr tablet method) of the typical disazo compounds expressed by Compound No. 1-32 according to the present invention.

TABLE 4

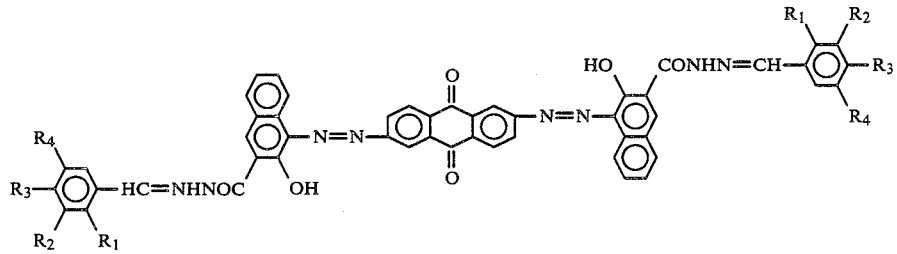

| Compound No. | $R_1$ | $R_2$ | $R_3$ | $R_4$ | Elementary analysis value (calculated point) | | | Melting point (°C.) | Infrared absorption spectrum (KBr disc) | |
|---|---|---|---|---|---|---|---|---|---|---|
| | | | | | C % | H % | N % | | $\nu NH$ (cm$^{-1}$) | $\nu co$ (cm$^{-1}$) |
| 1-32 | H | H | H | H | 71.27 (71.42) | 4.01 (3.83) | 13.26 (13.33) | >300 | 3210 | 1675 |
| 1-1 | —OCH$_3$ | H | H | H | 69.12 (69.32) | 3.90 (4.03) | 12.24 (12.44) | >300 | 3210 | 1675 |
| 1-2 | H | —OCH$_3$ | H | H | 69.16 (69.32) | 3.93 (4.03) | 12.46 (12.44) | >300 | 3200 | 1670 |
| 1-3 | H | H | —OCH$_3$ | H | 69.33 (69.32) | 3.89 (4.03) | 12.27 (12.44) | >300 | 3220 | 1675 |
| 1-4 | —CH$_3$ | H | H | H | 71.68 (71.87) | 3.86 (4.18) | 12.81 (12.90) | >320 | 3210 | 1675 |
| 1-5 | H | —CH$_3$ | H | H | 71.57 (71.87) | 3.92 (4.18) | 12.78 (12.90) | >300 | 3225 | 1675 |
| 1-6 | H | H | —CH$_3$ | H | 71.52 (71.87) | 3.96 (4.18) | 12.58 (12.90) | >300 | — | 1670 |
| 1-10 | Cl | H | H | H | 65.98 (66.01) | 3.31 (3.33) | 12.12 (12.32) | >300 | 3200 | 1670 |
| 1-11 | H | Cl | H | H | 65.87 (66.01) | 3.05 (3.33) | 11.99 (12.32) | >300 | 3225 | 1670 |
| 1-12 | H | H | Cl | H | 65.93 (66.01) | 3.16 (3.33) | 12.03 (12.32) | >300 | 3210 | 1670 |
| 1-18 | —NO$_2$ | H | H | H | 64.33 | 3.02 | 14.94 | >300 | 3190 | 1670 |

TABLE 4-continued

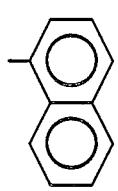

| Compound No. | R₁ | R₂ | R₃ | R₄ | Elementary analysis value (calculated point) | | | Melting point (°C.) | Infrared absorption spectrum (KBr disc) | |
|---|---|---|---|---|---|---|---|---|---|---|
| | | | | | C % | H % | N % | | νNH (cm⁻¹) | νco (cm⁻¹) |
| 1-19 | H | —NO₂ | H | H | (64.51)<br>64.29 | (3.25)<br>3.02 | (15.05)<br>14.80 | >300 | 3200 | 1670 |
| 1-20 | H | H | —NO₂ | H | (64.51)<br>64.33 | (3.25)<br>3.05 | (15.05)<br>14.80 | >300 | — | 1675 |
| 1-23 | —CH₃ | H | —CH₃ | H | (64.51)<br>72.49<br>(72.31) | (3.25)<br>4.37<br>(4.50) | (15.05)<br>12.31<br>(12.49) | >300 | 3210 | 1670 |
| 1-24 | —OCH₃ | H | H | —OCH₃ | 67.35<br>(67.49) | 3.96<br>(4.20) | 11.48<br>(11.66) | >300 | 3250 | 1680 |
| 1-25 | —OCH₃ | —OCH₃ | —OCH₃ | H | 65.52<br>(65.87) | 4.19<br>(4.35) | 10.67<br>(10.98) | >300 | 3200 | 1670 |
| 1-21 | H | H | —OC₂H₅ | H | 69.72<br>(69.82) | 4.38<br>(4.34) | 11.91<br>(12.06) | >300 | 3250 | 1675 |
| 1-13 | —Br | H | H | H | 59.65<br>(60.13) | 2.89<br>(3.03) | 10.99<br>(11.22) | >300 | 3200 | 1670 |
| 1-14 | H | —Br | H | H | 59.61<br>(60.13) | 2.86<br>(3.03) | 11.26<br>(11.22) | >300 | 3220 | 1670 |
| 1-15 | H | H | —Br | H | 60.16<br>(60.13) | 2.96<br>(3.03) | 10.91<br>(11.22) | >300 | 3200 | 1670 |

TABLE 5

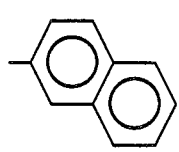

| Compound No. | A | Elementary analysis value (calculated point) | | | Melting point (°C.) | Infrared absorption spectrum (KBr disc) | |
|---|---|---|---|---|---|---|---|
| | | C % | H % | N % | | νNH (cm⁻¹) | νco (cm⁻¹) |
| 1-37 | (naphthalen-1-yl) | 73.95<br>(74.03) | 3.53<br>(3.86) | 11.70<br>(11.91) | >300 | 3200 | 1670 |
| 1-44 | (naphthalen-2-yl) | 73.88<br>(74.03) | 3.71<br>(3.86) | 11.69<br>(11.91) | >300 | 3220 | 1670 |

TABLE 5-continued

[Structure: A—HC=NHNOC-(OH)-naphthyl-N=N-anthraquinone-N=N-naphthyl-(HO)-CONHN=CH—A]

| Compound No. | A | Elementary analysis value (calculated point) | | | Melting point (°C.) | Infrared absorption spectrum (KBr disc) | |
|---|---|---|---|---|---|---|---|
| | | C % | H % | N % | | νNH (cm$^{-1}$) | νco (cm$^{-1}$) |
| 1-41 | (methoxynaphthyl) —OCH₃ | 72.01 (71.99) | 3.89 (4.03) | 11.00 (11.20) | >300 | 3220 | 1670 |
| 1-38 | (anthracenyl) | 75.99 (76.14) | 3.72 (3.87) | 10.80 (10.76) | >300 | 3200 | 1675 |
| 1-45 | (pyrenyl) | 77.06 (77.19) | 3.68 (3.70) | 10.55 (10.29) | >300 | 3220 | 1675 |
| 1-35 | (thienyl, S) | 64.80 (64.78) | 3.12 (3.31) | 13.35 (13.14) | >300 | 3200 | 1670 |
| 1-39 | (N-ethylcarbazolyl, N—C₂H₅) | 73.55 (73.73) | 4.22 (4.31) | 12.95 (13.03) | >300 | 3200 | 1670 |

TABLE 6

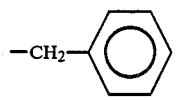

| Compound No. | R5 | Elementary analysis value (calculated point) | | | Melting point (°C.) | Infrared absorption spectrum (KBr disc) | |
|---|---|---|---|---|---|---|---|
| | | C % | H % | N % | | $\nu$NH (cm$^{-1}$) | $\nu_{co}$ (cm$^{-1}$) |
| 1-28 | —CH$_3$ | 71.67 (71.88) | 4.01 (4.17) | 12.77 (12.90) | >300 | 3240 | 1675 |
| 1-29 | —CH$_2$—⬡ | 74.99 (75.28) | 4.15 (4.34) | 10.81 (10.98) | >300 | 3210 | 1675 |
| 1-30 | —⬡ | 74.83 (74.99) | 3.78 (4.06) | 11.10 (11.28) | >300 | 3170 | 1675 |

EXAMPLE 1

76 parts by weight of disazo compound No. 1-32, 1260 parts by weight of polyester resin (VYLON 200: produced by TOYO BOSEKI K.K. (solid concentration: 2%) and 3700 parts by weight of tetrahydrofuran were pulverized and mixed in a ball mill. The resulting dispersion was applied onto the aluminum face of an aluminum-vapordeposited polyester base (electrically conductive substrate) by means of doctor blade, and same was air-dried to thereby form an about 1 μm-thick charge carrier generating layer.

Figure 1:
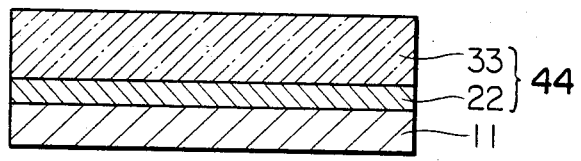
FIG. 1 is a grossly enlarged sectional view of an electrophotographic element embodying the present invention.

On the other hand, 2 parts by weight of charge transfer substance No. 2-49, 2 parts by weight of polycarbonate resin (Panlite K 1300: produced by TEIJIN K.K.) and 16 parts by weight of tetrahydrofuran were mixed and dissolved to obtain a solution. Then, this solution was applied onto said charge carrier generating layer by means of a doctor blade, dried at 80° C. for 2 minutes and then dried at 100° C. for 5 minutes, thereby forming an about 20 μm-thick charge transfer layer. Thus, the multilayer type element No. 1 illustrated in FIG. 1 was prepared.

EXAMPLES 2 TO 33

The exactly same procedure as Example 1 except that the disazo compound No. 1-32 and charge transfer substance No. 2-49 employed in Example 1 were replaced by the disazo compounds and charge transfer substances shown in Table 7 referred to afterwards to thereby prepare Elements No. 2 to 33.

These Elements No. 1 to 33 were subjected to −6 KV corona discharge for 20 seconds by means of an electrostatic copying paper tester (SP 428 TYPE: produced by Kawaguchi Electro Works) and charged negatively. Thereafter, these elements were left standing in the dark for 20 seconds to measure the surface potential Vpo(V) at that time. In succession, said elements were exposed to radiation of light from a tungsten lamp so that the intensity of illumination on their surfaces may be 4.5 lux. And, the time (second) required until the surface potential was reduced to ½ of Vpo was found out and the exposure amount E½ (lux·sec) was calculated therefrom on each element.

The thus obtained results are shown in Table 7.

TABLE 7

| Element No. | Disazo Compound No. | Charge transfer substance No. | Vpo (volt) | E½ (lux · sec) |
|---|---|---|---|---|
| 1 | 1-32 | 2-49 | −1289 | 9.1 |
| 2 | 1-32 | 2-44 | −481 | 5.2 |
| 3 | 1-32 | 2-1 | −1119 | 9.5 |
| 4 | 1-1 | 2-44 | −1096 | 7.7 |
| 5 | 1-2 | 2-44 | −291 | 4.8 |
| 6 | 1-2 | 2-1 | −1065 | 6.5 |
| 7 | 1-2 | 2-49 | −1303 | 7.1 |
| 8 | 1-4 | 2-44 | −930 | 5.8 |
| 9 | 1-4 | 2-1 | −1302 | 8.4 |
| 10 | 1-4 | 2-49 | −1444 | 6.5 |
| 11 | 1-5 | 2-44 | −406 | 4.8 |
| 12 | 1-5 | 2-1 | −1083 | 5.9 |
| 13 | 1-5 | 2-49 | −1439 | 5.3 |
| 14 | 1-6 | 2-44 | −469 | 10.6 |
| 15 | 1-6 | 2-1 | −1143 | 10.5 |
| 16 | 1-6 | 2-49 | −1411 | 10.4 |
| 17 | 1-10 | 2-24 | −1543 | 10.3 |
| 18 | 1-10 | 2-44 | −673 | 5.0 |
| 19 | 1-10 | 2-1 | −1189 | 9.0 |
| 20 | 1-10 | 2-49 | −1320 | 6.6 |
| 21 | 1-11 | 2-24 | −1521 | 9.8 |
| 22 | 1-11 | 2-1 | −1104 | 4.3 |
| 23 | 1-11 | 2-49 | −1247 | 3.8 |
| 24 | 1-12 | 2-24 | −1486 | 9.6 |
| 25 | 1-12 | 2-1 | −879 | 5.6 |
| 26 | 1-12 | 2-49 | −1315 | 4.5 |
| 27 | 1-18 | 2-44 | −244 | 3.4 |
| 28 | 1-18 | 2-1 | −1243 | 7.3 |
| 29 | 1-18 | 2-49 | −1061 | 8.1 |
| 30 | 1-19 | 2-1 | −857 | 3.9 |
| 31 | 1-19 | 2-49 | −1063 | 4.2 |
| 32 | 1-20 | 2-1 | −420 | 5.1 |
| 33 | 1-20 | 2-49 | −703 | 11.0 |

COMPARATIVE EXAMPLE 1

The multilayer type element disclosed in U.S. Pat. No. 3,871,882, wherein a perylene derivative is incorporated in the charge carrier generating layer and an oxadiazole derivative is incorporated in the charge transfer layer, was prepared in the undermentioned manner.

N,N'-dimethylperylene-3,4,9,10-tetracarboxylic acid diimide was used as the charge carrier generating substance, and same was vacuum vapordeposited on an aluminum plate under the conditions: degree of vacuum $10^{-5}$ mmHg, vapordeposition source temperature 300° C. and vapordeposition time 3 minutes to thereby form the charge carrier generating layer. In succession, a solution comprising 5 parts by weight of 2,5-bis(4-diethylaminophenyl)-1,3,4-oxadiazole, 5 parts by weight of polyester resin (Polyester Adhesive 49000, produced by Du Pont Co.) and 90 parts by weight of tetrahydrofuran was applied on the resulting charge carrier generating layer, and dried at 120° C. for 10 minutes to thereby form the charge transfer layer having a thickness of about 10 μm. Thus, Comparative element No. 1 was prepared.

COMPARATIVE EXAMPLE 2

The multilayer type element disclosed in Japanese Patent Publication No. 42380/1980, wherein Chloro Dian Blue was incorporated in the charge carrier generating layer and a hydrazon compound was incorporated in the charge transfer layer, was prepared in the undermentioned manner.

A solution comprising 25 parts by weight of Chloro Dian Blue, 1240 parts by weight of ethylene diamine, 990 parts by weight of n-butylamine and 2740 parts by weight of tetrahydrofuran was applied on the aluminum face of an aluminum-vapordeposited polyester base with a 25μ wet gap by means of a doctor blade and dried to thereby form the charge carrier generating layer. In succession, a solution comprising 10 parts by weight of 4-diethylaminobenzaldehyde 1,1-diphenylhydrazone, 10 parts by weight of polycarbonate resin (the same as the resin employed in Example 1) and 80 parts by weight of tetrahydrofuran was applied on the thus formed charge carrier generating layer by means of a doctor blade and dried to thereby form the charge transfer layer having a thickness of about 18μ. Thus, Comparative element No. 2 was prepared.

COMPARATIVE EXAMPLE 3

The multilayer type element disclosed in Japanese Laid Open Patent Application No. 84943/1980, wherein a distyrylbenzene type disazo compound was incorporated in the charge carrier generating layer and a hydrazone compound was incorporated in the charge transfer layer, was prepared in the undermentioned manner.

20 parts by weight of 4',4''-bis[2-hydroxy-3-(2,4-dimethylphenylcarbamoyl)-1-naphthylazo]-1,4-distyrylbenzene, 3 parts by weight of polyvinylbutyral (Denka Butyral #4000-1, produced by Tokyo Denki Kagaku K.K.), 7 parts by weight of polymethyl methacrylate (DIANAL BR-80, produced by Mitsubishi Rayon K.K.) and 300 parts by weight of tetrahydrofuran were ball-milled for 3 hours to thereby obtain a dispersion. This dispersion was diluted with 2700 parts by weight of tetrahydrofuran. Thereafter, this dispersion was applied on the aluminum face of an aluminum-vapordeposited polyester base (electrically conductive substrate) by means of a doctor blade and dried to thereby form an about 0.3 μ-thick charge carrier generating layer. In succession, a solution comprising 10 parts by weight of 1-methyl-1-phenyl hydrazone, 10 parts by weight of polycarbonate resin (the same resin as employed in Example 1) and 80 parts by weight of tetrahydrofuran was applied on said charge carrier generating layer and dried to thereby form an about 13 μ-thick charge transfer layer. Thus, Comparative multilayer type element No. 3 was prepared.

For the purpose of measuring the sensitive wavelengths for these comparative elements No. 1 to 3 and the elements NO. 23 and 31 of the present invention, said elements were subjected to spectral sensitivity measurement in accordance with the following procedure.

Figure 2:
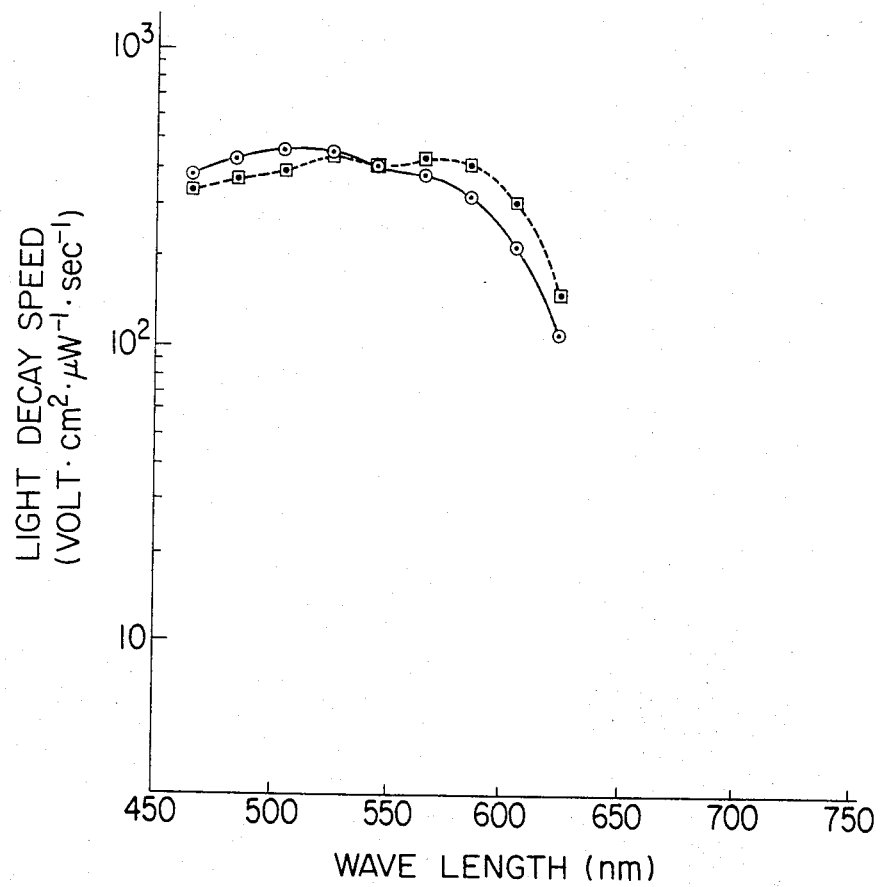
FIG. 2 is a graph illustrating spectral sensitivity characteristics of the elements according to the present invention.
Figure 3:
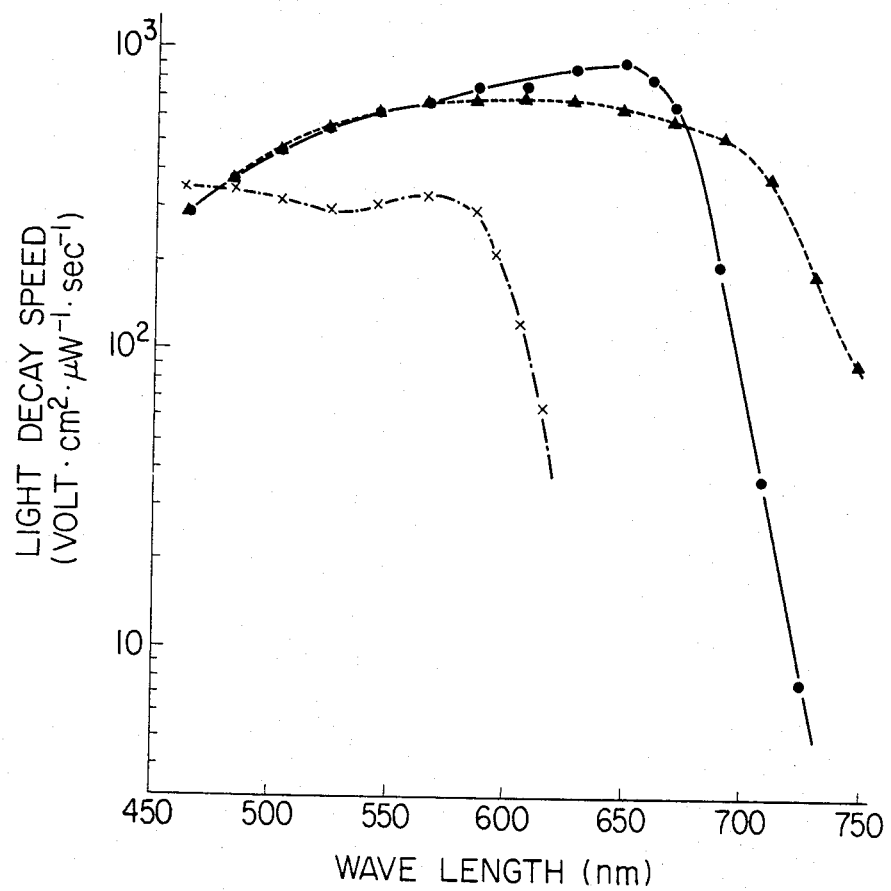
FIG. 3 is a graph illustrating spectral sensitivity characteristics of the comparative elements.

First, each element was charged by corona discharge in the dark so that its surface potential may become more than −800 V, and then subjected to dark decay until the surface potential becomes −800 V. When the surface potential became −800 V, the element was exposed to a monochromatic spectrum obtained by means of a monochrometer, its intensity of illumination on the element being 1 μW/cm². And, the time required until the surface potential decayed to −400 V was found out, and the half decay exposure amount (μW·sec/cm²) was calculated therefrom. On the other hand, the potential difference to be obtained actually by the exposure was found out by substracting the dark decayed potential portion from the apparent potential difference 400 V to be obtained by the exposure. Then, the light decay speed (Volt·cm²·μW$^{-1}$·sec$^{-1}$) was calculated from the actual potential difference and half decay exposure amount and named sensitivity. The thus obtained results were shown in FIGS. 2 and 3.

| | |
|---|---|
| -⊙-⊙- | Element No. 10 (FIG. 2) |
| -□-□- | Element No. 19 (FIG. 2) |
| -x-x- | Comparative Element No. 1 (FIG. 3) |
| -●-●- | Comparative Element No. 2. (FIG. 3) |
| -▲-▲- | Comparative Element No. 3 (FIG. 3) |

COMPARATIVE EXAMPLES 4 AND 5

For comparisons' sake, Comparative elements No. 4 and No. 5 were prepared respectively by repeating the exactly same procedure as employed in the preparation of the above element of the present invention described in Example 1 except that the charge transfer substance No. 2-49 replaced by substance No. 2-1 and the disazo compound of the present invention was replaced by (1) 4,4'-bis(2-hydroxy-3-phenylcarbamoyl-1-naphthylazo)-3,3'-dichlorodiphenyl (Chloro Dian Blue) coming under the benzidine type disazo compounds disclosed in the above mentioned Japanese Laid Open Patent Applications Nos. 37543/1970 and 55643/1977, and (2) 4,4'-bis(2-hydroxy-3-phenylcarbamoyl-1-naphthylazo) stilbene coming under the stilbene type disazo compounds disclosed in Japanese Laid Open Patent Application No. 8832/1977, respectively.

The thus prepared comparative elements No. 4 and No. 5 together with the element No. 30 according to the present invention were subjected to electrostatic characteristic measurement by means of a commercially available electrostatic copying paper tester (SP-428 TYPE, produced by Kawaguchi Electro Works). In more detail, said elements were first subjected to −6 KV corona discharge for 20 seconds and charged negatively to thereby measure the surface potential at that time and find out Vdo (V). Then, the said elements were left standing in the dark for 20 seconds for dark decay purpose to thereby measure the surface potential at that time and find out Vdo (V). In succession, the elements were exposed to radiation of light from a tungsten lamp so that the intensity of illumination on their surfaces may be 4.5 lux. And, the time required until the surface potential was reduced to ½ of Vpo was found out and named the exposure amount E½ (lux·sec). Likewise, the time required until the surface potential Vpo was reduced to 1/5 and 1/10 were found out respectively, and then the exposure amount E1/5 (lux·sec) and the surface amount E1/10 (lux·sec) were calculated therefrom respectively. The obtained results were shown in Table 8.

TABLE 8

| Element | Vdo (V) | Vpo (V) | Vpo/Vdo | E½ lux·sec) | E1/5 (lux·sec) | E1/10 (lux·sec) |
|---|---|---|---|---|---|---|
| Our element No. 30 | −1230 | −857 | .697 | 3.9 | 7.3 | 9.1 |
| Comparative element No. 4 | −940 | −693 | .738 | 5.9 | 12.3 | 16.7 |
| Comparative element No. 5 | −1817 | −1501 | .826 | 19.3 | 51.0 | 75.0 |

It can be seen from the above results that the element using the disazo compound according to the present invention is high in sensitivity and its sensitive wavelengths cover the range of about 460 to 600 nm. Accordingly, the element according to the present invention is superior in the reproductivity of red image and so can dispense with a red filter when actually set in a copying machine.

Further, as the preparation of the electrophotographic element according to the present can dispense with the necessity of employing the vacuum vapor-deposition as used in the preparation of said comparative element No. 1 or using the organic amine as used in the preparation of said comparative element No. 2, the element of the present invention should be said profitable from the viewpoint of production.

Still further, the elements Nos. 23 and 31 of the present invention were each subjected to 10,000 times repeated reproduction by means of a copying machine RICOPY P-500 manufactured by RICOH COMPANY, LTD. As the result, each element was found to produce a clear-cut image. It may be understood therefrom that the elements of the present invention are extremely superior in durability.

What is claimed is:

1. An electrophotographic element comprising a charge carrier generating layer and a charge transfer layer formed on an electrically conductive substrate, wherein said charge carrier generating layer contains therein a disazo compound represented by the general formula (I):

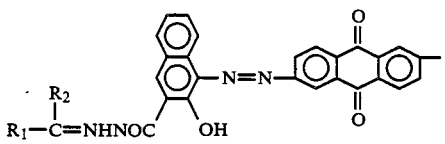

(I)

-continued

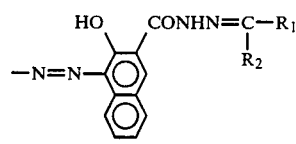

wherein, $R_1$ and $R_2$ are the same or different and each stands for hydrogen, $C_1$-$C_4$ lower alkyl group, a substituted or unsubstituted aralkyl group, a substituted or unsubstituted aromatic group, or a substituted or unsubstituted hetero group, or

forms a ring.

2. An electrophotographic element according to claim 1 wherein said charge carrier generating layer is formed on said electrically conductive substrate and said charge transfer layer is formed on the charge carrier generating layer.

3. An electrophotographic element according to claim 1 wherein the charge carrier generating layer is 0.01-5 μm thick and the charge transfer layer is 2-100 μm thick.

4. An electrophotographic element according to claim 3 wherein the charge carrier generating layer is 0.05-2 μm thick and the charge transfer layer is 5-40 μm thick.

5. An electrophotographic element according to claim 1 wherein the charge carrier generating layer contains 10-100 wt.% of said disazo compound.

6. An electrophotographic element according to claim 1 wherein the charge transfer layer contains 10-80 wt.% of a charge transfer substance.

7. An electrophotographic element according to claim 1, wherein $R_1$ and $R_2$ each stands for hydrogen, a methyl group, an ethyl group, a propyl group, a substituted or unsubstituted benzyl group, phenetyl group, phenyl group, naphthyl group, anthryl group, pyrenyl group, anthraquinonyl group, thienyl group, furyl group, pyridyl group or carbazolyl group, and $R_1$ and $R_2$ may be the same or different.

8. An electrophotographic element according to claim 7 wherein the substituent on said substituted benzyl group is $C_1$-$C_4$ lower alkyl group, $C_1$-$C_4$ lower alkoxy group, halogen, a cyano group, nitro group or $C_2$-$C_8$ lower dialkylamino group.

9. An electrophotographic element according to claim 1 wherein $R_1$ and $R_2$ mutually bond to form a substituted or unsubstituted hexylidene, pentylidene, benzopentylidene or dibenzopentylidene ring.

10. An electrophotographic element according to claim 9 wherein the substituent is $C_1$-$C_4$ lower alkyl group, $C_1$-$C_4$ lower alkoxy group, halogen, a cyano group, a nitro group or $C_2$-$C_8$ lower dialkylamino group.

11. An electrophotographic element according to claim 1 wherein $R_1$ stands for hydrogen and $R_2$ stands for a substituted or unsubstituted aromatic or hetero ring.

12. An electrophotographic element according to claim 1 wherein $R_1$ stands for hydrogen and $R_2$ stands for a benzene ring, a naphthalene ring, an anthracene ring, a pyran ring, an anthraquinone ring, a thiophene ring, a furan ring, a pyridine ring or a carbazole ring.

13. An electrophotographic element according to claim 11 wherein the substituent is $C_1$-$C_4$ lower alkyl group, $C_1$-$C_4$ lower alkoxy group, halogen, a cyano group, a nitro group or $C_2$-$C_8$ lower dialkylamino group.

14. An electriophotographic element according to claim 1 wherein $R_1$ stands for hydrogen, and $R_2$ stands for a phenyl group, o-, m- or p-methylphenyl group, o-, m- or p-methoxyphenyl group, o-, m- or p-fluorophenyl group, o-, m- or p-chlorophenyl group, o-, m- or p-bromophenyl group, o- or p-cyanophenyl group, o-, m- or p-nitrophenyl group, p-ethoxyphenyl group, p-N,N-dimethylaminophenyl group, 2,4-dimethylphenyl group, 2,5-dimethoxyphenyl group, 2,3,4-trimethoxyphenyl group, 2,4-dichlorophenyl group, 3,4-dichlorophenyl group,

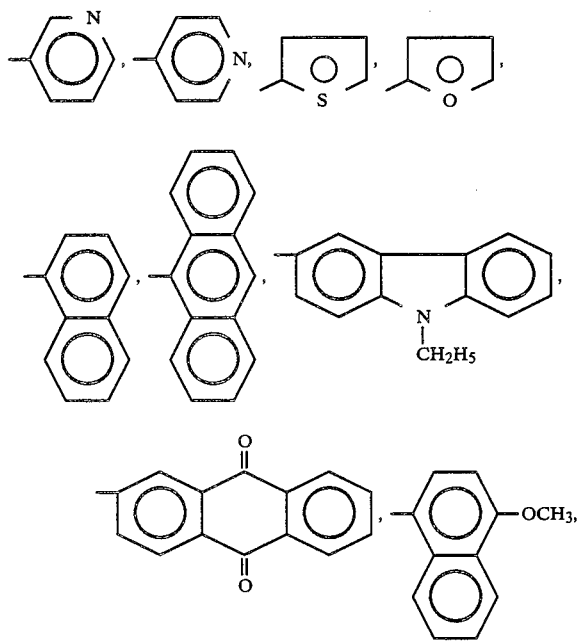

or an ethyl group.

15. An electrophotographic element according to claim 1 wherein $R_1$ stands for hydrogen and $R_2$ stands for

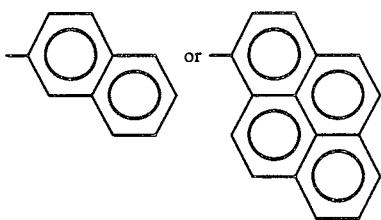

16. An electrophotographic element according to claim 1 wherein $R_1$ stands for a methyl group and $R_2$ stands for a phenyl group, or a p-chlorophenyl group, or $R_1$ stands for a phenyl group and $R_2$ stands for a phenyl group or a benzyl group.

17. An electrophotographic element according to claim 1 wherein

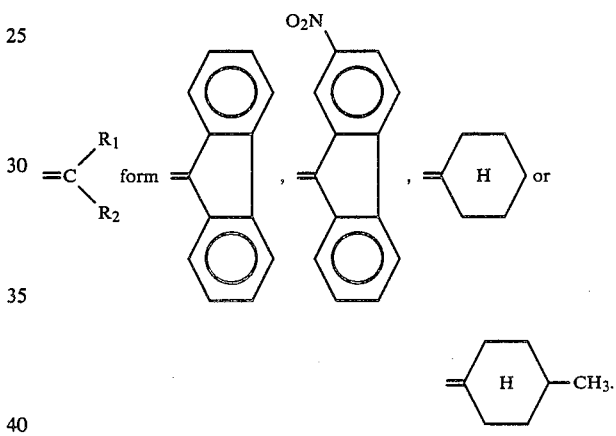

18. An electrophotographic element according to claim 1 wherein $R_1$ stands for hydrogen, and $R_2$ stands for a phenyl group, o-, m- or p-methylphenyl group, o- or m-methoxyphenyl group, o-, m- or p-chlorophenyl group or o-, m- or p-nitrophenyl group.

* * * * *